(12) United States Patent
Yoshida

(10) Patent No.: US 10,057,479 B2
(45) Date of Patent: Aug. 21, 2018

(54) ELECTRONIC APPARATUS AND METHOD FOR SWITCHING TOUCH OPERATIONS BETWEEN STATES

(71) Applicant: CANON KABUSHIKI KAISHA, Tokyo (JP)

(72) Inventor: Koji Yoshida, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/283,969

(22) Filed: Oct. 3, 2016

(65) Prior Publication Data
US 2017/0104921 A1    Apr. 13, 2017

(30) Foreign Application Priority Data
Oct. 9, 2015    (JP) .................................. 2015-201544

(51) Int. Cl.
*H04N 5/232* (2006.01)

(52) U.S. Cl.
CPC ..... *H04N 5/23216* (2013.01); *H04N 5/23241* (2013.01); *H04N 5/23293* (2013.01)

(58) Field of Classification Search
CPC ........... H04N 5/23216; H04N 5/23293; H04N 5/23241
USPC .................................................... 348/333.02
See application file for complete search history.

(56) References Cited

U.S. PATENT DOCUMENTS

| 2006/0274179 | A1* | 12/2006 | Sugiyama | H04N 5/23241 348/333.01 |
| 2009/0002516 | A1* | 1/2009 | Suzuki | H04N 5/23212 348/223.1 |
| 2013/0222671 | A1* | 8/2013 | Tseng | H04N 5/23216 348/333.11 |
| 2013/0329110 | A1* | 12/2013 | Yoshida | H04N 5/23293 348/333.02 |
| 2014/0340557 | A1* | 11/2014 | Ishihara | H04N 5/2353 348/333.01 |

FOREIGN PATENT DOCUMENTS

JP    2013-196367 A    9/2013

* cited by examiner

*Primary Examiner* — Lin Ye
*Assistant Examiner* — Chan Nguyen
(74) *Attorney, Agent, or Firm* — Carter, Deluca, Farrell & Schmidt, LLP

(57) ABSTRACT

An electronic apparatus performs control so as to, when a touch restriction mode is not set, change a setting of the apparatus in accordance with a touch operation having been performed in a case where a first screen is displayed, and execute a specific function in accordance with a touch operation having been performed in a case where a second screen different from the first screen is displayed, and when the touch restriction mode is set, change a setting of the apparatus in accordance with a touch operation having been performed in a case where the first screen is displayed, and to not execute at least the specific function in accordance with a touch operation in a case where the second screen is displayed.

18 Claims, 8 Drawing Sheets

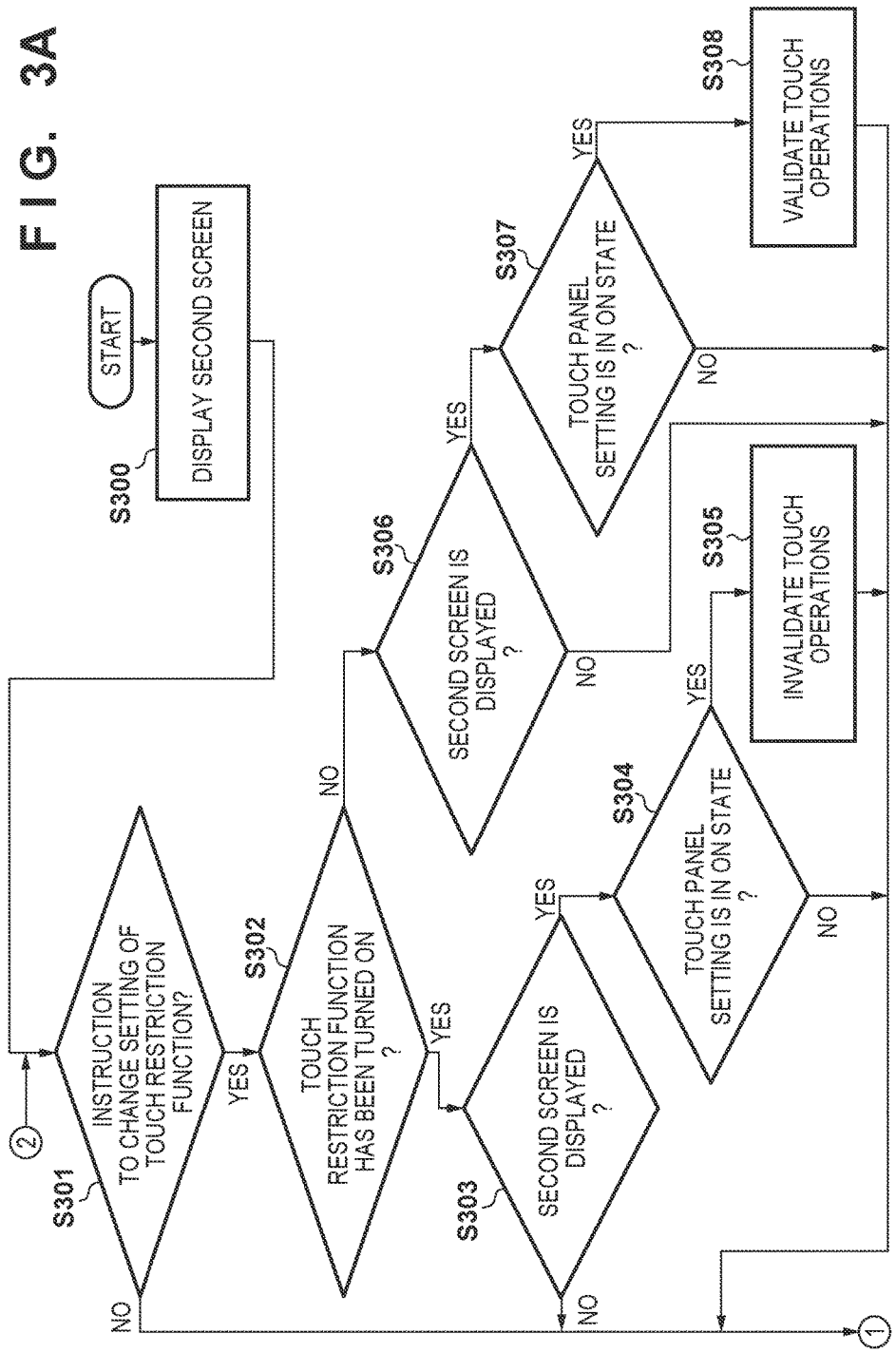

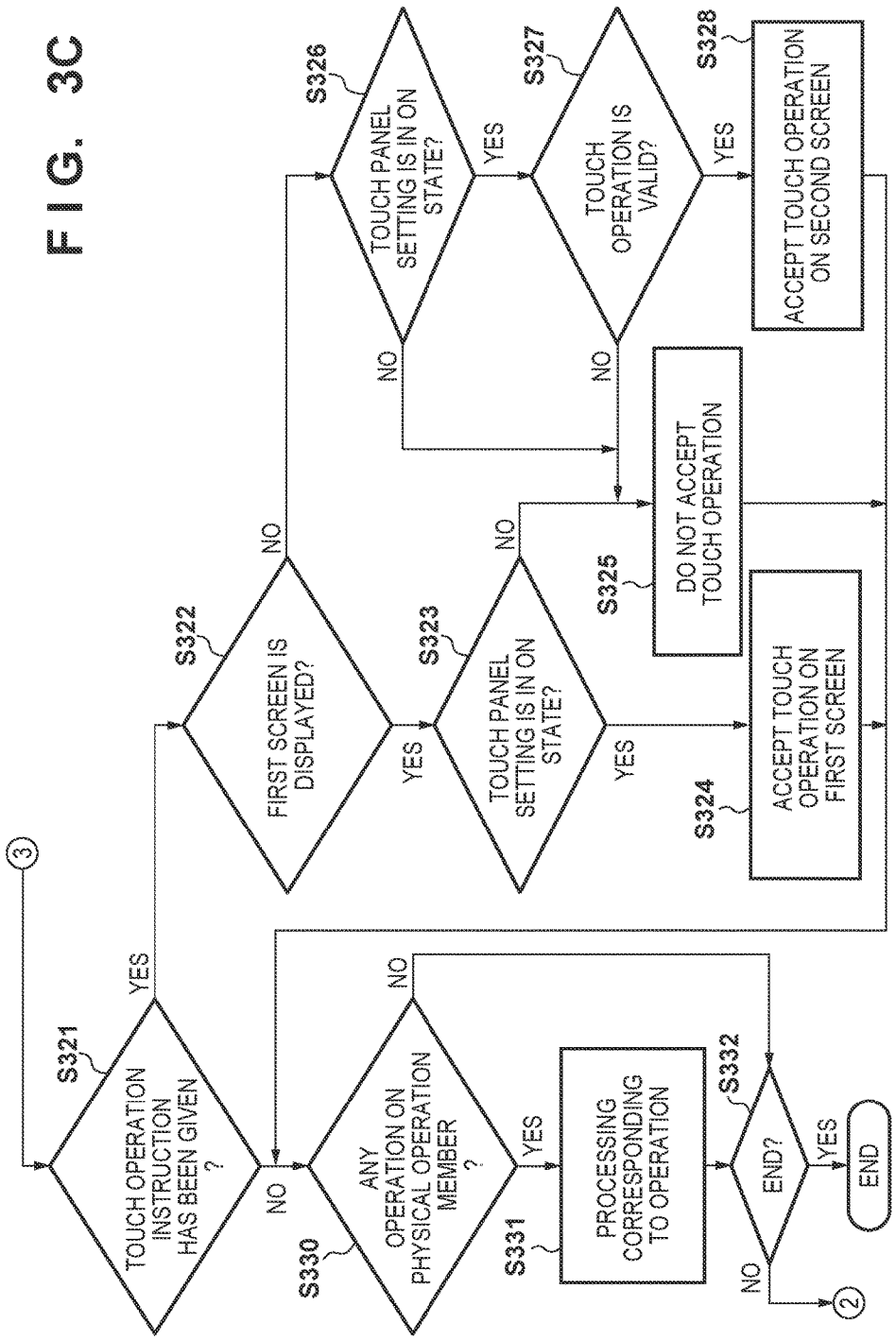

INVERTED CLOSED POSITION

OPEN POSITION

INVERTED OPEN POSITION

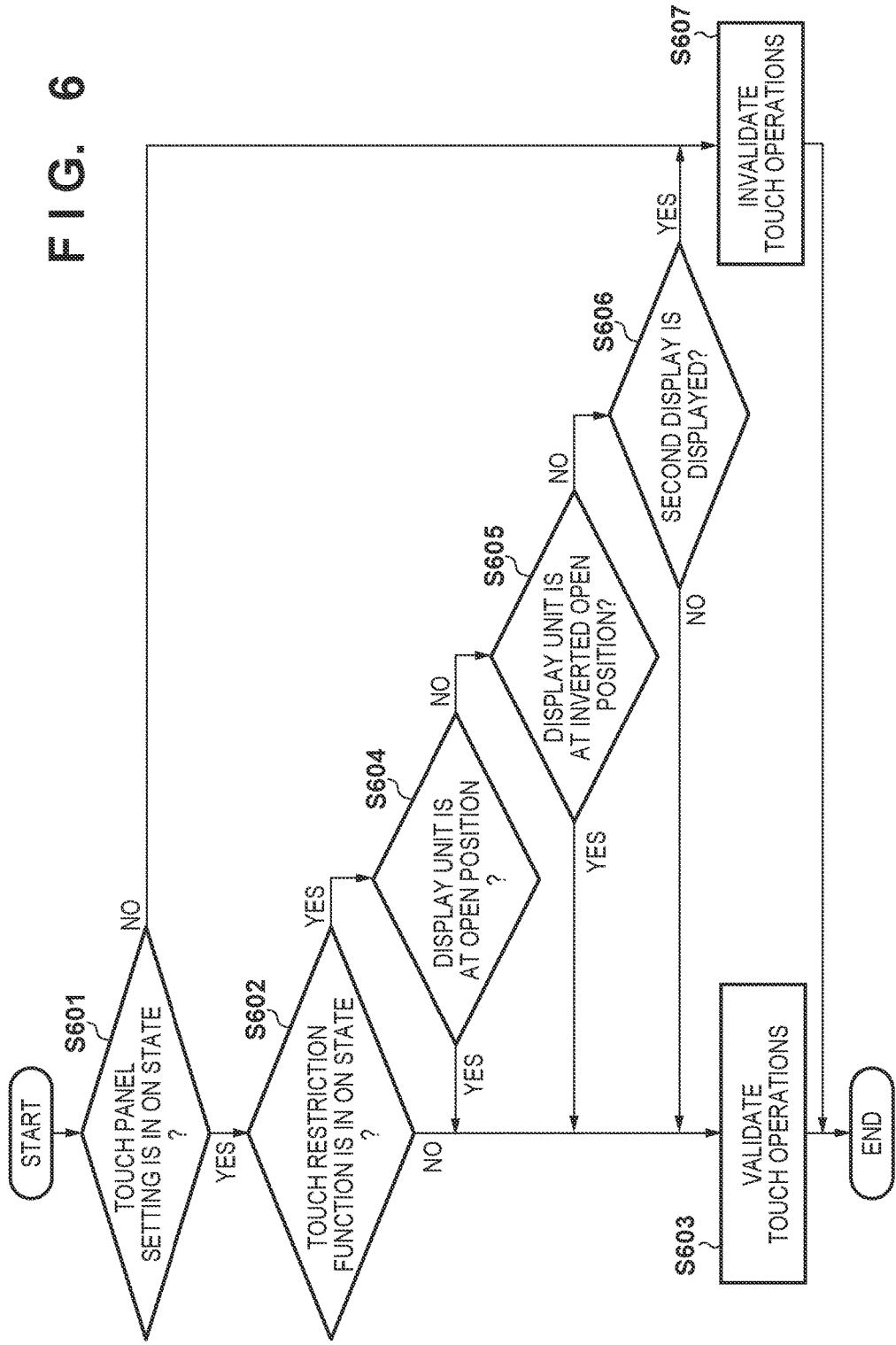

ELECTRONIC APPARATUS AND METHOD FOR SWITCHING TOUCH OPERATIONS BETWEEN STATES

BACKGROUND OF THE INVENTION

Field of the Invention

The present invention relates to electronic apparatuses and methods for controlling the electronic apparatuses, and relates particularly to a technique for switching touch operations made to a touch panel between valid and invalid states.

Description of the Related Art

There are conventional electronic apparatuses in which all touch operations made to the electronic apparatus can be switched between valid and invalid states with one setting for touch operations (Japanese Patent Laid-Open No. 2013-196367).

However, in Japanese Patent Laid-Open No. 2013-196367, all touch operations made to an electronic apparatus can be switched between valid and invalid states with one setting. Accordingly, for example, if the electronic apparatus is used such that touch operations are invalidated in the case of preventing an unintended operation from being executed when a screen is accidentally touched, as in the case of a shooting standby screen, and touch operations are to be validated in the case of actively using touch operations, as in the case of a setting screen, the setting needs to be changed from a menu screen or the like at all such times, and it would be convenient if quick and easy switching of touch operations between valid and invalid states was possible.

SUMMARY OF THE INVENTION

The present invention has been made in consideration of the aforementioned problems, and realizes a technique for enabling quick and easy switching of touch operations between valid and invalid states in accordance with a display screen.

In order to solve the aforementioned problems, the present invention provides an electronic apparatus comprising: a detection unit configured to detect a touch operation; a setting unit configured to set a touch restriction mode for restricting acceptance of a touch operation, in accordance with a specific operation different from a touch operation having been performed; and a control unit configured to perform control so as to, in a state where the touch restriction mode is not set, change a setting of the apparatus in accordance with a touch operation having been performed in a case where a first screen is displayed on a display unit, and execute a specific function in accordance with a touch operation having been performed in a case where a second screen different from the first screen is displayed on the display unit, and in a state where the touch restriction mode is set, change a setting of the apparatus in accordance with a touch operation having been performed in a case where the first screen is displayed on the display unit, and not execute at least the specific function in accordance with a touch operation in a case where the second screen is displayed on the display unit.

In order to solve the aforementioned problems, the present invention provides a control method of an electronic apparatus which has a detection unit configured to detect a touch operation and a setting unit configured to set a touch restriction mode for restricting acceptance of a touch operation in accordance with a specific operation different from a touch operation having been performed, the method comprising: performing control so as to, in a state where the touch restriction mode is not set, change a setting of the apparatus in accordance with a touch operation having been performed in a case where a first screen is displayed on a display unit, and execute a specific function in accordance with a touch operation having been performed in a case where a second screen different from the first screen is displayed on the display unit, and in a state where the touch restriction mode is set, change a setting of the apparatus in accordance with a touch operation having been performed in a case where the first screen is displayed on the display unit, and not execute at least the specific function in accordance with a touch operation in a case where the second screen is displayed on the display unit.

In order to solve the aforementioned problems, the present invention provides a non-transitory computer-readable storage medium storing a program for causing a computer to function as a detection unit, a setting unit and a control unit of an electronic apparatus, wherein the detection unit detects a touch operation; the setting unit sets a touch restriction mode for restricting acceptance of a touch operation, in accordance with a specific operation different from a touch operation having been performed; and the control unit performs control so as to, in a state where the touch restriction mode is not set, change a setting of the apparatus in accordance with a touch operation having been performed in a case where a first screen is displayed on a display unit, and execute a specific function in accordance with a touch operation having been performed in a case where a second screen different from the first screen is displayed on the display unit, and in a state where the touch restriction mode is set, change a setting of the apparatus in accordance with a touch operation having been performed in a case where the first screen is displayed on the display unit, and to not execute at least the specific function in accordance with a touch operation in a case where the second screen is displayed on the display unit.

According to the present invention, it is possible to perform quick and easy switching of touch operations between valid and invalid states in accordance with a display screen.

Further features of the present invention will become apparent from the following description of exemplary embodiments (with reference to the attached drawings).

BRIEF DESCRIPTION OF THE DRAWINGS

FIGS. 3A to 3C are flowcharts showing exemplary processing on a first screen and a second screen according to the present embodiment.

FIG. 6 is a flowchart showing exemplary touch restriction processing in accordance with the position of the display unit in a touch control mode according to the present embodiment.

DESCRIPTION OF THE EMBODIMENTS

Embodiments in which an electronic apparatus according to the present invention is applied to an image capture apparatus such as a digital camera that has a variable angle type display provided with a touch panel will be described below in detail with reference to accompanied drawings.

First Embodiment

Apparatus Configuration

The appearance and internal configuration of a digital camera according to the present embodiment will be described below with reference to FIGS. 1 and 2.

Figure 1:
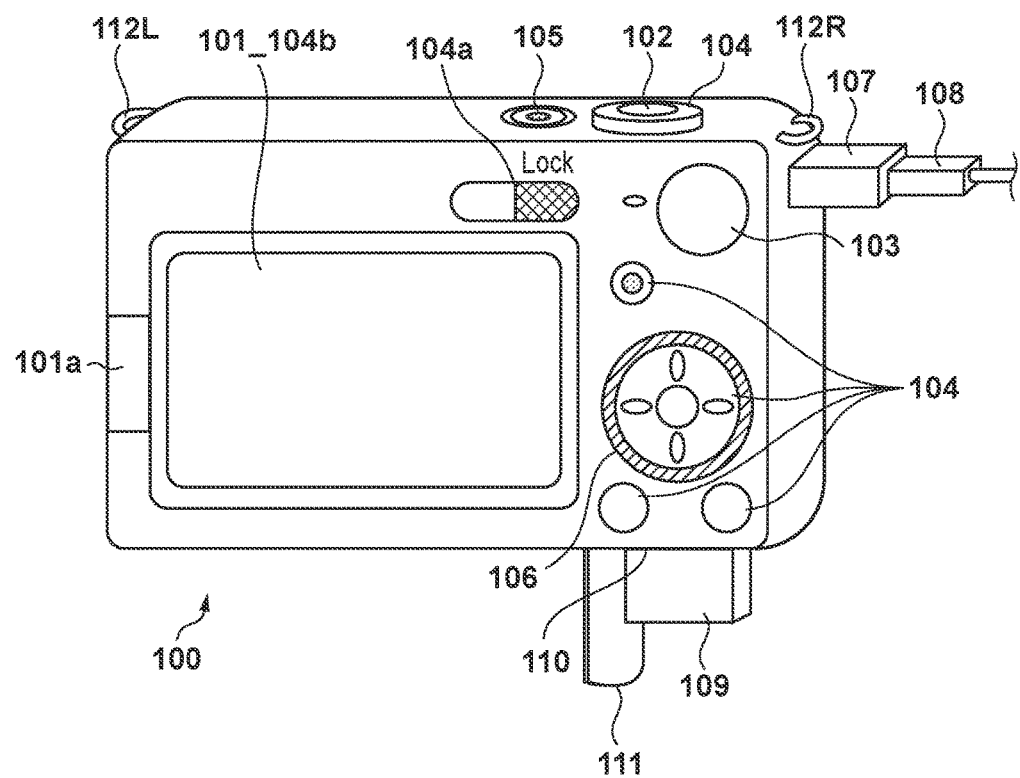
FIG. 1 is a diagram showing an appearance of an electronic apparatus according to a present embodiment.

In FIG. 1 which shows an external appearance of a digital camera 100 according to the present embodiment, a display unit 101 is comprised of a liquid crystal display panel (LCD) for displaying images and various information. A touch panel 104b for detecting a touch operation on a display surface of the display unit 101 is configured to be integrated in the display unit 101. A shutter button 102 is an operation unit for giving a shooting instruction and a shooting preparation instruction. A mode switching button 103 is an operation unit for changing over among various modes. A connector 107 is an interface that connects a connection cable 108 for connection with an external device with the digital camera 100. Operation units 104 comprise operation members such as various switches, buttons, a touch panel 104b operated in various ways by the user. A controller wheel 106 is a rotatable electronic dial included among the operation units 104. A power switch 105 is an operation unit for switching the power between on and off.

A touch restriction switch 104a is an operation member included in the operation units 104 and is capable of turning on and off a touch restriction function. If the touch restriction switch 104a is moved to a "Lock" side, the touch restriction function (touch restriction mode) is turned on, and if the touch restriction switch 104a is moved to the side opposite to the "Lock" side, the touch restriction function (touch restriction mode) is turned off. Note that the touch restriction switch 104a may be a slidable switch as in the present embodiment, or may be a push-button switch or the like.

A strap is attached to strap attaching portions 112L and 112R. The user can hang the digital camera 100 from his/her neck using the strap attached thereto. If the digital camera 100 is hung from the user's neck, in a state where the digital camera 100 is not operated (i.e. not held in a hand), a back part of the digital camera 100 often comes into contact with or approaches the user's belly. For this reason, there are cases where the digital camera 100 coming into contact with or approaching the user's belly is detected as a touch operation by the touch panel 104b, and an erroneous operation occurs. In the present embodiment, for example, such an erroneous operation caused by a touch operation is mitigated by the touch restriction function.

A recording medium 109 is a medium such as a memory card or hard disk. A recording medium slot 110 is for accommodating the recording medium 109. The recording medium 109 accommodated in the recording medium slot 110 makes it possible to communicate with the digital camera 100, and the digital camera 100 can write or read an image file therein/therefrom. A cover 111 covers the recording medium slot 110. FIG. 1 shows a state where the cover 111 is opened to remove the recording medium 109 from the slot 110, and a part of the recording medium 109 is exposed.

Figure 2:
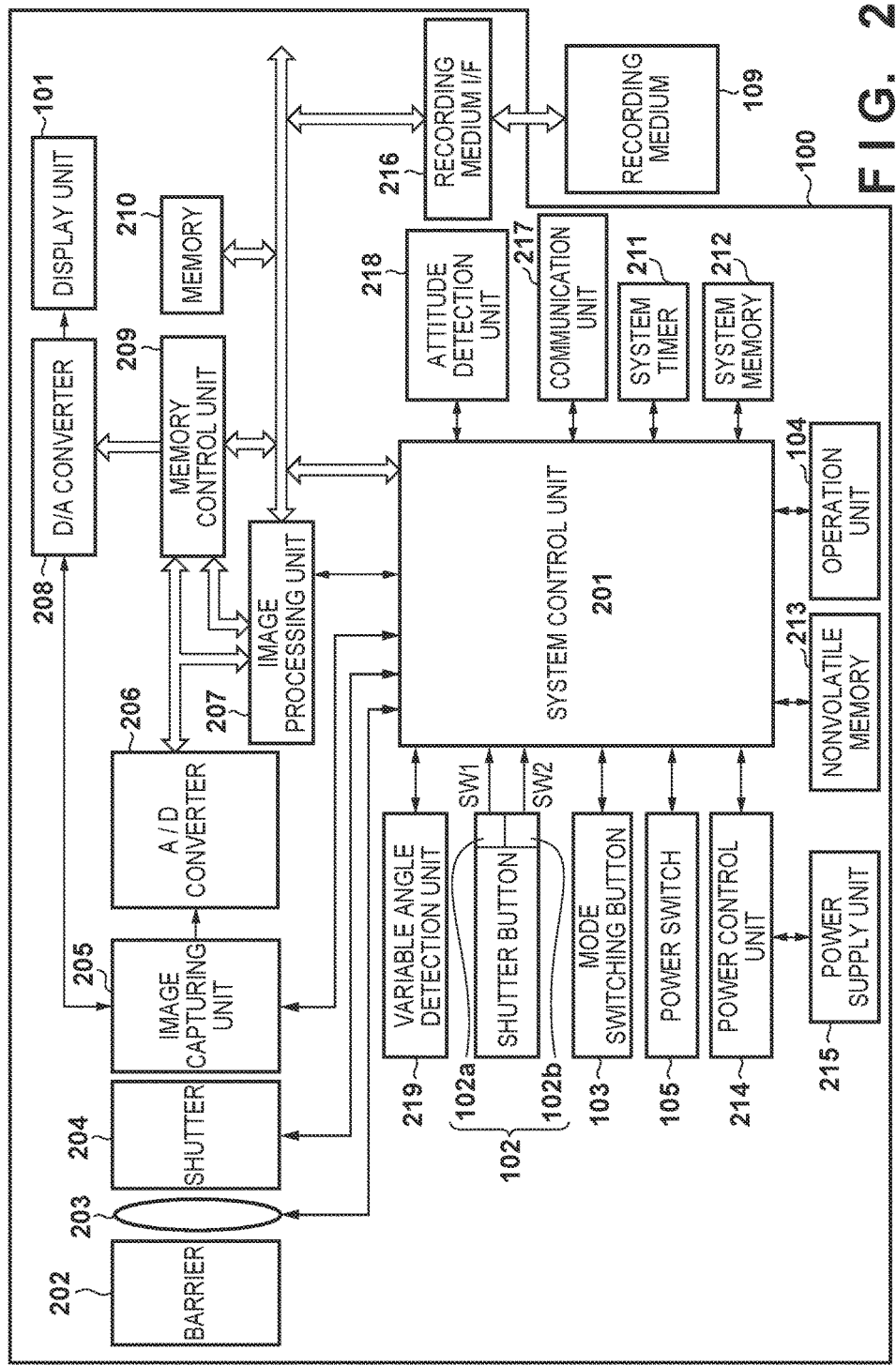
FIG. 2 is a block diagram showing an internal configuration of an electronic apparatus according to the present embodiment.

In FIG. 2 which shows an internal configuration of the digital camera 100 according to the present embodiment, a photographic lens 203 is a lens group including a zoom lens and a focusing lens. A shutter 204 has a diaphragm function. An image capturing unit 205 is an image sensor, which is constituted by a CCD or CMOS or the like, for converting an optical image of an object to an electric signal. An A/D converter 206 converts an analog signal to a digital signal. The A/D converter 206 is used to convert an analog signal, which is output from the image capturing unit 205, to a digital signal. A barrier 202 covers an image capturing system (which includes the photographic lens 203) of the digital camera 100, thereby preventing contamination of and damage to the image capturing system that includes the photographic lens 203, the shutter 204 and the image capturing unit 205. Note that the photographic lens 203 may be fixed to or detachable from the digital camera 100.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using captured image data, and a system control unit 201 performs exposure control and distance measuring control based on the obtained calculation results. Thus, AF (Automatic Focus) processing, AE (Automatic Exposure) processing, and EF (flash pre-emission) processing of TTL (Through-The-Lens) type are performed. Furthermore, the image processing unit 207 performs predetermined calculation processing using the captured image data, and AWB (Automatic White Balance) processing of TTL type on the basis of the calculation results.

The output data from the A/D converter 206 is directly written into a memory 210 via both the image processing unit 207 and the memory control unit 209 or via the memory control unit 209. The memory 210 stores the image data obtained from the image capturing unit 205 and converted to digital data by the A/D converter 206, and image data to be displayed on the display unit 101. The memory 210 has a storage capacity that is sufficient for storing a predetermined number of still images as well as moving images and audio for a predetermined time.

The memory 210 also functions as a memory for image display (video memory). A D/A converter 208 converts the image display data stored in the memory 210 into an analog signal and supplies the display unit 101 with the analog signal. The image display data that was written into the memory 210 is thus displayed by the display unit 101 via the D/A converter 208. The display unit 101 performs, on a display device such as an LCD, display in accordance with the analog signal from the D/A converter 208. The digital signals that have been subjected to A/D conversion by the A/D converter 206 and stored in the memory 210 are converted into analog signals by the D/A converter 208, and the analog signals are successively transmitted to the display unit 101, making it possible to realize an electronic view finder (EVF) functionality and to perform through-the-lens image display by a live view.

The display unit 101 is a variable angle type display with which the position at which the display unit 101 is connected to the digital camera 100 so as to be able to rotate around two axes that are perpendicular at least to the optical axis, via a hinge unit 101a is variable. The user can freely change the direction and the angle of a display surface of the variable angle type display relative to the digital camera 100, and rotate the variable angle type display. Note that the display unit 101 is not limited to the above-described variable angle type, and may be of a tilt type in which the display unit 101 can be rotated in the up-down direction (around a horizontal axis perpendicular to the optical axis) with the hinge unit as a rotation axis, and the display surface thereof can be tilted relative to the vertical direction.

A variable angle detection unit 219 can detect the direction and the angle of the display surface of the display unit 101, or a change therein. The system control unit 201 can determine, based on the detection results of the variable angle detection unit 219, whether the display surface of the display unit 101 is located at an "inverted closed position", an "open position", or an "inverted open position" shown in FIG. 5.

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later in the present embodiment.

The system control unit 201 controls the overall digital camera 100, and realizes, by executing the programs stored in the aforementioned nonvolatile memory 213, each process according to the present embodiment that will be described later. The system memory 212 is, for example, a RAM. In the system memory 212, constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a time measurement unit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a still image shooting mode, a moving image recording mode, and a reproduction mode. The still image shooting mode includes an automatic shooting mode, an automatic scene determination mode, a manual mode, scene-specific shooting modes, a program AE mode, a custom mode, and the like. Using the mode switching button 103, the mode is directly switched to any of these modes included in the still image shooting mode. Alternatively, it is also possible to switch, using the mode switching button 103, to the still image shooting mode and then to switch, using another operation member, to any of these modes included in the still image shooting mode. Similarly, the moving image recording mode may also include a plurality of modes.

While the shutter button 102 provided on the digital camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 207 to start operations such as the AF (Automatic Focus) processing, the AE (Automatic Exposure) processing, the AWB (Automatic White Balance) processing, the EF processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 201 starts operations in a series of shooting processing from reading out the signal from the image capturing unit 205 to writing of image data to the recording medium 109.

By selecting various functional icons displayed on the display unit 101, appropriate functions for each scene are assigned to the operation members in the operation units 104, and the operation units 104 thus act as various function buttons. Examples of these function buttons include an end button, a back button, an image scrolling button, a jump button, a narrow-down button, an attribute change button, and a menu button. For example, a menu screen that enables various settings to be made is displayed on the display unit 101 by pressing the menu button. The user can make various settings intuitively by using the menu screen, which is displayed on the display unit 101, four-direction (up, down, left, right) buttons and a SET button.

Included among the operation units 104 is also a touch panel 104b that is capable of detecting a touch on the display unit 101. The touch panel 104b and the display unit 101 can be constructed as a single integrated unit. For example, the touch panel 104b is constructed in such a manner that the transmittance of light will not interfere with the display presented by the display unit 101, and it is attached to the uppermost layer of the display surface of the display unit 101. In addition, input coordinates on the touch panel 104b and display coordinates on the display unit 101 are correlated. As a result, a GUI can be constructed that makes it possible for the user to directly manipulate the screen displayed on the display unit 101. The system control unit 201 is capable of detecting the following operations on the touch panel 104b, or the conditions of the touch panel 104b.

Newly touching of the touch panel 104b by a finger or pen which has not been in contact with the touch panel 104b, that is, a start of the touch (referred to as "touch-down" below).

A state in which the touch panel 104b is in contact with a finger or pen (referred to as "touch-on" below).

A movement of a finger or pen while in contact with the touch panel 104b (referred to as "touch-move" below).

Lifting of a finger or pen that has been in contact with the touch panel 104b, that is an end of the touch (referred to as "touch-up" below).

A state in which the touch panel 104b is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel is being touched by the finger or pen are communicated to the system control unit 201 through an internal bus and, based upon the information thus communicated, the system control unit 201 determines what kind of operation was performed on the touch panel. As for "touch-move", the determination can be made also for every vertical component and horizontal component on the touch panel with regard to the direction of movement of the finger or pen, which is moved on the touch panel, based upon a change in the position coordinates. Further, it is assumed that a stroke has been made when "touch-up" is performed following a regular "touch-move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The system control unit 201 can determine that a "flick" has been performed when it detects touch-move over a predetermined distance or greater and at a predetermined speed or greater and then detects "touch-up". Further, the system control unit 201 determines that "drag" has been performed if it detects touch-move over a predetermined distance or greater at a speed less than a predetermined speed. The touch panel may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed. Note that the touch restriction function according to the present embodiment for reducing the occurrence of an erroneous operation as a result of the touch panel 104b detecting contact or approach of the user's belly thereto as a touch operation exerts its effect more in the method in which even approach to the touch panel is detected as a touch operation. For example, it is more effective to apply the present embodiment to the case of employing a touch panel using an electrostatic capacitance method, an infrared method, or a photo-sensor method.

The controller wheel 106, which is a rotatable operation member included in the operation units 104, is used together with the direction buttons when a selection item is specified.

A power control unit 214 is constituted by, for example, a battery detection circuit, a DC-DC converter, and a switch circuit for changing over the block to be supplied with power, and detects whether or not a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li-ion battery, or an AC adaptor. The recording medium interface (I/F) 216 is for interfacing with the recording medium 109 such as the memory card or hard disk. The recording medium 109 is a recording medium such as a memory card for recording shot images, and constituted by a semiconductor memory, a magnetic disk, or the like.

A communication unit 217 performs transmitting/receiving video and sound to/from an external device communicably connected via a wireless antenna or wired cable. The communication unit 217 is also connectable to a wireless LAN (Local Area Network) and the Internet. The communication unit 217 can transmit data of an image (including a through the lens image) captured by the image capturing unit 205 and an image file recorded in the recording medium 109 to an external device, and receive image data and other various kinds of information from an external device. As the external device, the external device is a personal computer, a printer, other digital camera, a smart phone which is a kind of a mobile telephone terminal and various types of service providing servers and the like are supposed.

An attitude detection unit 218 detects the attitude of the digital camera 100 with respect to the gravity direction. Based on the attitude detected by the attitude detection unit 218, it is possible to discriminate whether an image captured by the image capturing unit 205 has been shot by setting the digital camera 100 in the landscape or portrait direction. The system control unit 201 can add information about the attitude detected by the attitude detection unit 218 to the data of the image captured by the image capturing unit 205, and rotate and record the image data. An acceleration sensor, gyro sensor and the like may be used as an attitude detection unit.

Note that the hardware configuration is not limited to that shown in FIG. 2, and a configuration is also possible in which, for example, a single item of hardware performs display control, communication control, shooting control, image processing control, and the like, so as to function as each unit or block of the digital camera 100. Alternatively, it is also possible that a plurality of items of hardware operate in cooperation with each other to function as a single unit or block.

Touch Control Mode

Next, a description will be given, with reference to FIGS. 3A to 3C, of operation in the case of turning on the touch restriction function while a first screen or a second screen is being displayed in the touch control mode according to the present embodiment.

Figure 3B:
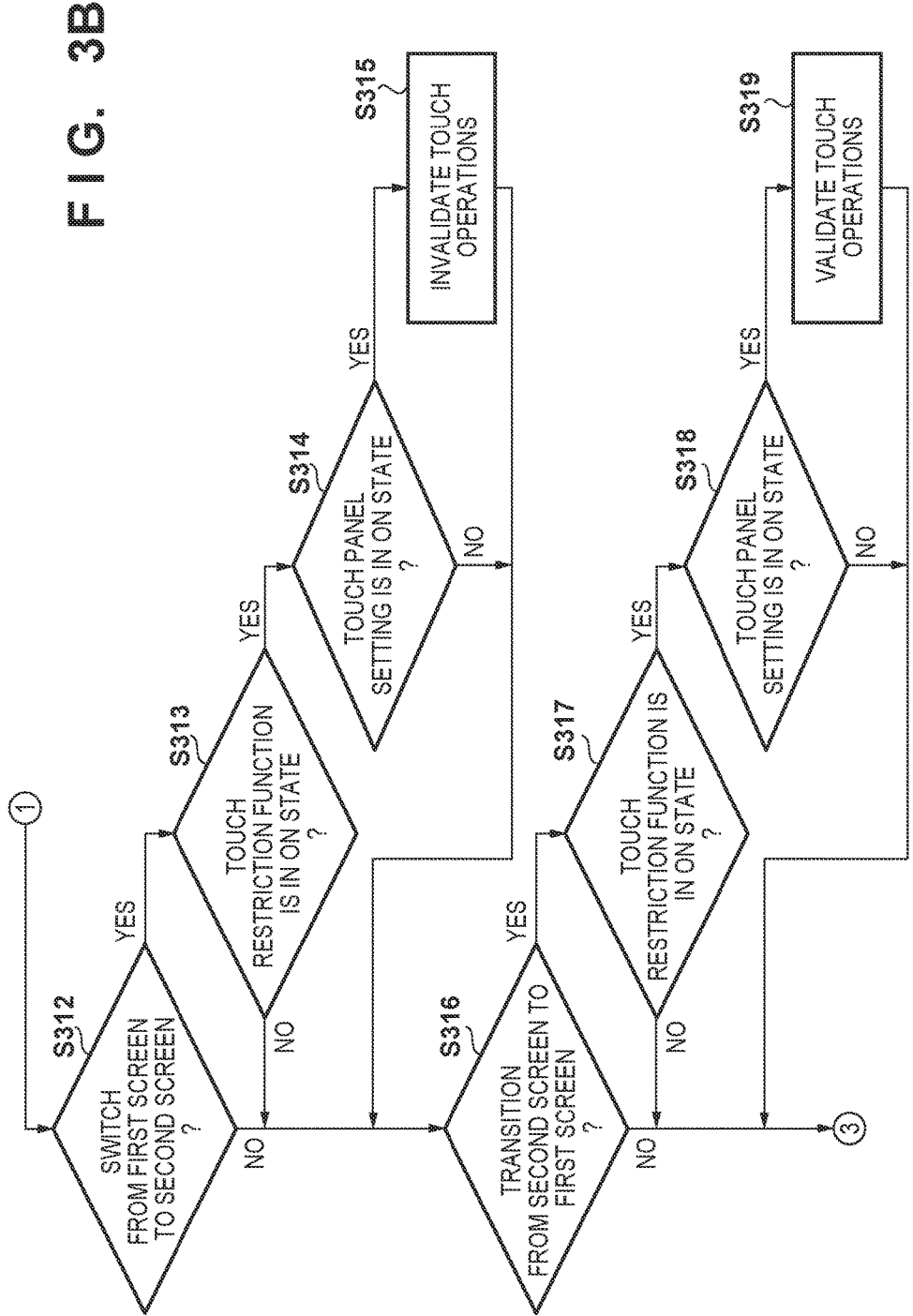

Note that the processing in FIGS. 3A to 3C is started upon the power switch 105 of the digital camera 100 being turned on, and is achieved by a program stored in the nonvolatile memory 213 being expanded in the system memory 212 and executed by the system control unit 201.

In the touch control mode according to the present embodiment, upon the touch restriction switch 104a being set to the "Lock" side to turn on the touch restriction function, only touch operations made to the touch panel 104b are invalid in shooting standby, and other operations on the operation member are valid. Conversely, when not in shooting standby, touch operations on the touch panel 104b are valid. Thus, in the digital camera 100 according to the present embodiment, touch operations on the screen on which live view is being displayed are invalid, whereas touch operations can be performed on other screens even if the touch restriction function is ON.

Figure 4A:
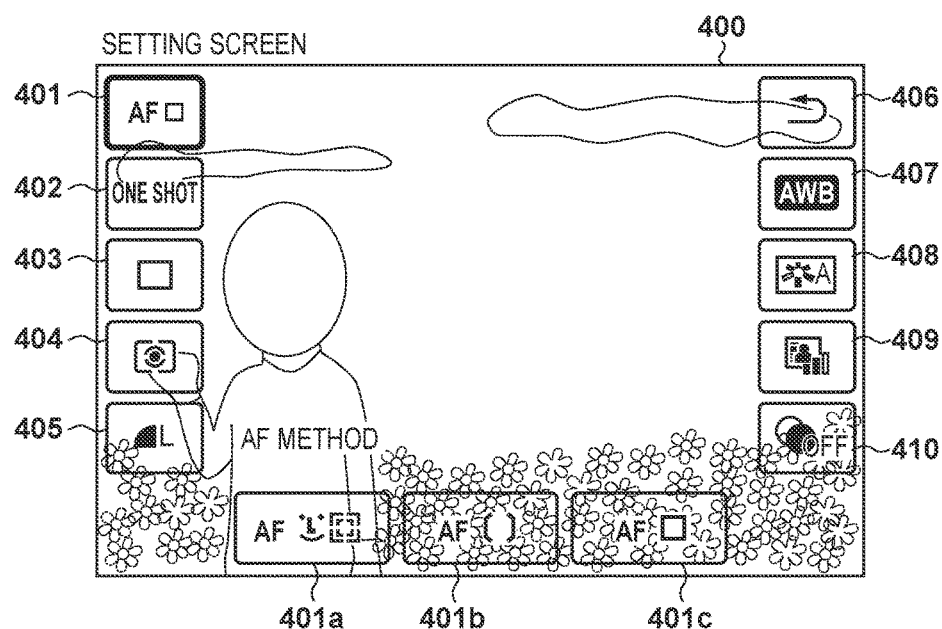
FIGS. 4A and 4B are diagrams showing an exemplary first screen and second screen according to the present embodiment.
Figure 4B:
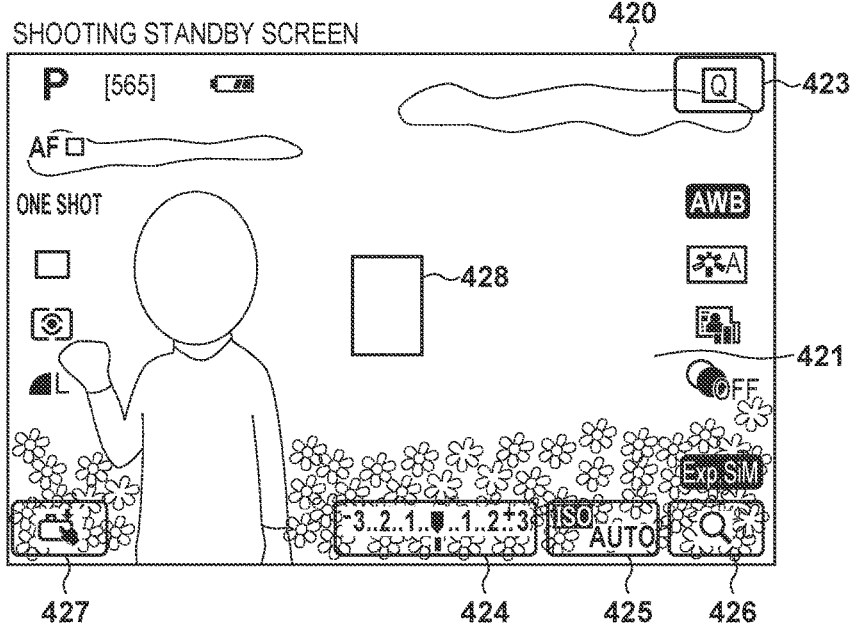

FIG. 4A shows an exemplary display of a first screen 400 that is displayed on the display unit 101 in the touch control mode according to the present embodiment, and FIG. 4B shows an exemplary display of a second screen 420. All screens displayed on the digital camera 100 according to the present embodiment can be divided into the first screen 400 and the second screen 420.

The first screen 400 is a setting screen displayed mainly for setting various functions of the digital camera 100, and setting items 401 to 410 for various functions that can be selected by a touch operation, and options for a selected item are displayed. In the digital camera 100 according to the present embodiment, on the first screen 400, a setting item 401 for setting the AF type, a setting item 402 for setting AF operations, a setting item 403 for setting the number of images to be shot, a setting item 404 for setting a photometry mode, a setting item 405 for setting recording quality, a return button 406 for switching the screen to a shooting standby screen (the second screen 420 in FIG. 4B), and other setting items 407 to 410 such as a setting item for setting white balance are displayed as setting items for setting various functions. Upon any of the items being selected by a touch operation, options for the selected item are displayed. In FIG. 4A, options 401a to 401c for the item for setting the AF type are displayed. The user can change settings of a desired function by selecting, with a touch operation, at least one of the setting items relating to shooting operations or shooting conditions and setting items relating to recording quality or the number of images to be shot that are displayed on the first screen 400, and touching one of the options.

The second screen 420 is a screen displayed mainly for purposes other than settings of various functions of the digital camera 100, and the setting items for various functions are not displayed therein. In the digital camera 100 according to the present embodiment, the second screen 420 is a shooting standby screen of the digital camera 100. On the second screen 420, a setting state of various functions set on the first screen 400 is displayed so as to be superimposed with a live view image 421, and function buttons 423 to 427 for shooting are also displayed. The function button 423 is a quick setting button for switching the screen to the setting screen (the first screen 400 in FIG. 4A). The function button 424 is a touch button for changing the exposure. The function button 425 is a touch button for changing the ISO sensitivity. The function button 426 is an enlargement button for displaying a live view image enlarged at a higher magnification ratio than that for the live view image 421. The function button 427 is a touch button for turning on and off a touch shutter function for shooting an image by touching the screen. If a position other than the function buttons 423 to 427 on the screen 420 is touched with the touch shutter function in an on state, the touched position is brought into focus, and shooting processing is automatically performed. With the touch shutter function in an off state, if a position other than the function buttons 423 to 427 on the screen 420 is touched, the AF area is changed to the touched position.

Note that the screen that is initially displayed on start-up of the digital camera 100 is the second screen. If the touch restriction function is ON, touch operations on the second screen are not accepted.

The user can execute at least one of the operations including switching of the screen, changing the exposure, changing the ISO sensitivity, enlarging a live view image, setting the touch shutter function, and changing the AF area, by touching a function button displayed on the second screen 420.

Note that the screen that is initially displayed on start-up of the digital camera 100 is the second screen.

In FIG. 3A, in step S300, the system control unit 201 displays the second screen on the display unit 101.

In step S301, the system control unit 201 determines whether or not an instruction to change the setting of the touch restriction function has been given by the touch restriction switch 104a, which is included in the operation units 104. In the present embodiment, it is determined whether or not the touch restriction switch 104a has been operated. The processing proceeds to step S302 if the instruction has been given (i.e. the touch restriction switch 104a has been operated), and the processing ends if not. Note that, immediately after the power is turned on, exceptionally, validity/invalidity of touch operations is set in accordance with the current position of the touch restriction switch 104a regardless of whether or not the setting of the touch restriction function has been changed, and therefore, the processing proceeds to step S302.

In step S302, the system control unit 201 determines whether or not the touch restriction function has been turned on, and the processing proceeds to step S303 if the touch restriction function has been turned on, and proceeds to step S306 if not. In the present embodiment, it is determined that the touch restriction function has been turned on if the touch restriction switch 104a has been moved to the "Lock" side, and it is determined that the touch restriction function has been turned off if the touch restriction switch 104a has been moved to the side opposite to the "Lock" side. Note that, if the touch restriction switch is of a push-button type, a setting regarding whether the touch restriction function is ON or an off state is stored in the system memory 212 or the nonvolatile memory 213. If the touch restriction switch 104a is pressed in the case where the stored setting indicates the on state, the touch restriction function is turned off, and if the touch restriction switch 104a is pressed in the case where the stored setting is the off state, the touch restriction function is turned on.

In step S303, the system control unit 201 determines whether or not the second screen is being displayed on the display unit 101, and the processing proceeds to step S304 if the second screen is being displayed, and proceeds to step S312 if not (e.g. if the first screen is being displayed).

In step S304, the system control unit 201 determines whether or not a touch panel setting is ON, and the processing proceeds to step S305 if the touch panel setting is ON, and ends if not. Note that the touch panel setting refers to a function of validating or invalidating all touch operations on the digital camera 100. Touch operations are valid if the touch panel setting is ON (except when the touch restriction switch 104a is on the "Lock" side on the second screen), and are invalid if the touch panel setting is OFF. If invalid, a function corresponding to a touch operation made to the touch panel 104b is not executed. The touch panel setting can be configured using the menu screen displayed on the display unit 101, the four-direction (up, down, left, right) buttons, the SET button, and the like by the user, and the settings are stored in the nonvolatile memory 213.

In step S305, since the touch restriction function is ON, the system control unit 201 invalidates touch operations even if the touch panel setting is ON. If touch operations are invalidated, setting information indicating that touch operations have been invalidated is held in the system memory 212 or the nonvolatile memory 213. Thus, the acceptance of touch operations is inhibited, and even if the touch panel is touched, the operation corresponding to the touch operation is not executed, and the time until an automatic power-off function for power-saving is executed is not extended either. Also, if touch operations are invalidated, the system control unit 201 changes the display appearance of the function buttons 423 to 427 that are being displayed on the second screen from a state where touch operations are valid to a display appearance for indicating that touch operations are not accepted. Thus, the user can identify that touch operations have been invalidated. An icon or a message indicating that touch operations are invalid due to the touch restriction function having been turned on may further be displayed.

In step S306, the system control unit 201 determines whether or not the second screen is being displayed on the display unit 101, and the processing proceeds to step S307 if the second screen is being displayed, and proceeds to step S312 if not.

In step S307, the system control unit 201 determines whether or not the touch panel setting is ON, and the processing proceeds to step S308 if the touch panel setting is ON, and proceeds to step S312 if not.

In step S308, since the touch restriction function is OFF and the touch panel setting is ON, the system control unit 201 validates touch operations. That is, setting information indicating that touch operations have been validated is held in the system memory 212 or the nonvolatile memory 213. The system control unit 201 also changes the display appearance of the function buttons 423 to 427 that have been displayed on the second screen from a state where touch operations are invalid to the display appearance for indicating that touch operations are accepted. Thus, the user can identify that touch operations have been validated. If an icon or a message indicating that touch operations are invalid due to the touch restriction function having been turned on was displayed, the display of this icon or message is hidden.

In FIG. 3B, in step S312, the system control unit 201 determines whether or not an instruction to switch the screen to the second screen (shooting standby screen) has been given. If the instruction to switch the screen to the second screen has been given, the screen is switched to the second screen, and the processing proceeds to step S313, and if not, the processing proceeds to step S316. If the second screen was already displayed, the determination result in step S312 is NO. If any of the following events has occurred in a state where the first screen is displayed, it is determined that an instruction to switch the screen from the first screen (setting screen) to the second screen (shooting standby screen) has been given: a press of the menu button included in the operation units 104 (a press of a cancel button), a press of the SET button included in the operation units 104 in a state where a selection frame is positioned on the return button 406, and a touch-up from the return button 406; a half-press operation made to the shutter button 102 (turning on of first shutter switch 102a); and an elapse of a predetermined time with no operation performed (the time from when a last operation made to the operation units 104 was performed in a state where the first screen is displayed). Note that an operation made to the touch panel 104b is also regarded as an operation, and if a touch operation made to the touch panel 104b has been performed, the measured time in a non-operation state is reset, and time measurement is restarted. Since the screen also transitions to the second screen due to a half-press operation made to the shutter button 102, essentially, the second screen is displayed after shooting is performed. Also, essentially, the second screen is displayed when a setting on the setting screen has ended.

In step S313, the system control unit 201 determines whether or not the touch restriction function is set to an on state (i.e. whether or not the touch restriction switch 104a is located on the "Lock" side, and the processing proceeds to step S314 if the touch restriction function is ON, and proceeds to step S316 if not.

In step S314, the system control unit 201 determines whether or not the touch panel setting is set to an on state, and the processing proceeds to step S315 if the touch panel setting is ON, and proceeds to step S316 if not. The touch panel setting is similar to that described in step S304.

In step S315, the system control unit 201 invalidates touch operations. This is similar to the processing described in step S305, and setting information indicating that touch operations have been invalidated is held in the system memory 212 or the nonvolatile memory 213. That is, if the touch restriction function is ON, touch operations are invalidated even if the touch panel setting is ON, in accordance with the screen having been switched to the second screen. The system control unit 201 also displays the function buttons 423 to 427 in the second screen in the display appearance for indicating that touch operations are not accepted. Thus, the user can identify that touch operations are invalid. Furthermore, an icon or a message indicating that touch operations are invalid due to the touch restriction function being in an on state may further be displayed.

In step S316, the system control unit 201 determines whether or not an instruction to switch the screen from the second screen (shooting standby screen) to the first screen (setting screen) has been given. The processing proceeds to step S317 if the instruction has been given, and proceeds to step S321 if not. If the first screen was already displayed, the determination result in step S316 is NO. If any of the following events has occurred in a state where the second screen is displayed, it is determined that an instruction to switch the screen from the second screen (shooting standby screen) to the first screen (setting screen) has been given: a press of a setting button (function button), which is a physical push button included in the operation units 104, and a touch-up from a quick setting button 423 when touch operations are valid. This is in the case where the operation accepted in later-described step S328 is a touch-up from the quick setting button 423. That is, if touch operations are valid, the transition to the first screen can be achieved by either a touch operation or a press of the physical button, and even if touch operations are invalid, the transition can be achieved by a press of the physical button.

In step S317, the system control unit 201 determines whether or not the touch restriction function is set to an on state (i.e. whether or not the touch restriction switch 104a is located on the "Lock" side), and the processing proceeds to step S318 if the touch restriction function is ON, and proceeds to step S321 if not.

In step S318, the system control unit 201 determines whether or not the touch panel setting is set to an on state, and the processing proceeds to step S319 if the touch panel setting is ON, and proceeds to step S321 if not. The touch panel setting is similar to that described in step S304.

In step S319, the system control unit 201 validates touch operations. This is similar to the processing described in step S308, and setting information indicating that touch operations have been validated is held in the system memory 212 or the nonvolatile memory 213. That is, if the touch panel setting is ON, touch operations are validated even if the touch restriction function is ON, in accordance with the screen having been switched to the first screen. Also, the function buttons 401 to 410 on the first screen are displayed in the display appearance for indicating that touch operations are accepted. Furthermore, if an icon or a message indicating that touch operations are invalid due to the touch restriction function being in an on state has been displayed, the display of this icon or message is hidden.

Thus, control is performed such that, if the screen is switched from the second screen to the first screen, touch operations on the first screen are accepted even if the touch restriction function is ON, whereas if the screen is switched from the first screen to the second screen, touch operations are not accepted if the touch restriction function is ON.

In FIG. 3C, in step S321, the system control unit 201 determines, regarding the display unit 101, whether or not a touch operation has been performed on the touch panel 104b, and the processing proceeds to step S322 if a touch operation has been performed, and proceeds to step S330 if not.

In step S322, the system control unit 201 determines whether or not the first screen is being displayed on the display unit 101, and the processing proceeds to step S323 if the first screen is being displayed, and proceeds to step S326 if not, i.e. if the second screen is being displayed.

In step S323, the system control unit 201 determines whether or not the touch panel setting is set to an on state, and the processing proceeds to step S324 if the touch panel setting is ON, and proceeds to step S325 if not. The touch panel setting is similar to that described in step S304.

In step S324, the system control unit 201 accepts the touch operation made to the first screen and executes processing corresponding to the touch operation. For example, if a touch-down on any of the function buttons 401 to 410 has been performed, the system control unit 201 changes the display appearance of the touched function button so as to be identifiable from the other function buttons. If a touch-up from any of the function buttons 401 to 410 is detected, a setting item indicated by the function button at the touch-up position is selected as an item regarding which setting is to be changed. A shooting setting can be changed by a touch operation made to a function button displayed as an option of set values for the selected setting item. For example, if a touch-up from any of the options 401a to 401c for the item for setting the AF type has occurred, the setting is changed such that the AF type indicated by the function button of the option at the touch-up position is selected.

In step S325, the system control unit 201 does not accept the touch operation. That is, even if a touch operation is detected in step S321, the function corresponding to the detected touch operation is not executed. For example, even if a touch-down on any of the function buttons 401 to 410 is detected on the first screen, identification display indicating that a function button has been touched down is not performed. Also, even if a touch-up from any of the function buttons 401 to 410 is detected, the function corresponding to the function button at the touch-up position is not executed. Note that in order to have the user identify that the touch operation is not accepted, if a touch operation is detected in step S321, a warning sound (buzzer sound) may be issued, or an icon indicating that the touch operation is invalid (restricted) may be displayed in step S325. That is, there may be cases of issuing a warning or the like in accordance with the touch operation, but at least some specific functions among executable functions in later-described step S328 are not executed in accordance with the touch operation. However, such functions may be able to be executed according to an operation made to the operation units 104 excluding the touch panel 104b.

Note that a warning message indicating that the touch operation is invalid (restricted) may be displayed together with or in place of the aforementioned icon indicating that the touch operation is invalid. The time measurement of the timer for automatic power-off is not extended in accordance with a touch operation that has caused the display (icon, warning, etc.) indicating that the touch operation is invalid. That is, even if a touch operation that has caused the display indicating that the touch operation is invalid has been performed, it is deemed that a non-operation state is continuing. This is because there is a possibility that a touch operation which has caused the display indicating that the touch operation is invalid was an erroneous touch caused by the hand holding the digital camera 100, or an erroneous touch caused by the belly when the digital camera 100 is hung using a strap, for example. Note that if a touch operation has been performed when the remaining time until automatic power-off is executed is within a predetermined time, a display indicating that the touch operation is invalid (restricted) may be performed, and thereafter the time until the execution of automatic power-off may be extended for a predetermined time (e.g. six seconds) in which the user can check this display. Furthermore, it is favorable that, once the automatic power-off time is extended for the predetermine time period, the automatic power-off time will not be further extended even if a touch operation is performed, until the power is turned off thereafter. With this operation, it is possible to prevent a state where automatic power-off will not be executed due to an erroneous touch, while reliably allowing the user to check the display indicating that the touch operation is invalid.

In step S326, the system control unit 201 determines whether or not the touch panel setting is set to an on state (i.e. whether or not the touch restriction switch 104a is located on the "Lock" side), and the processing proceeds to step S327 if the touch panel is set to an on state, and proceeds to step S325 if not. The touch panel setting is similar to that described in step S304.

In step S327, the system control unit 201 references the setting information (the information changed in steps S305, S308, S315, and S319) held in the system memory 212 or the nonvolatile memory 213, and determines whether or not touch operations are valid. The processing proceeds to step S325 if valid, and proceeds to step S328 if not valid (i.e. if invalid). If the touch restriction function is ON and touch operations are invalid, the touch operation is not accepted on the second screen in step S325. That is, even if a touch operation is detected in step S321, a function corresponding to the detected touch operation is not executed. For example, even if a touch-down on any of the function buttons 423 to 427 on the second screen is detected, identification display indicating that a function button has been touched down is not performed. Also, even if a touch-up from any of the function buttons 423 to 427 is detected, a function corresponding to the function button at the touch-up position is not executed. Note that in order to have the user identify that the touch operation is not accepted, if a touch operation is detected in step S321, a warning sound (buzzer sound) may be issued, or an icon indicating that the touch operation is invalid (restricted) may be displayed in step S325. In particular, even if a touch operation made to the quick setting button 423 has been performed, this touch operation is ignored, and the screen does not transition to the first screen (setting screen). It is thereby possible to prevent the screen from transitioning to the first screen (setting screen) and various shooting settings from being changed by an accidental touch operation. Also, even if a touch-down on a position other than the function buttons 423 to 427 on the second screen is detected, a change of the AF area, focusing, and shooting processing are not performed. Accordingly, it is possible to prevent the AF area or the focusing position from changing and unintended shooting from being performed due to an accidental touch operation.

In step S328, the system control unit 201 accepts touch operations made to the second screen. Thus, in the digital camera 100 according to the present embodiment, for example, it is possible to accept touch operations made to the function buttons 423 to 426 on the shooting standby screen in FIG. 4B or another screen, switch the screen to the setting screen (FIG. 4A), change the exposure, change the ISO sensitivity, enlarge a live view image, configure settings of the touch shutter function, and change the AF area, for example.

In step S330, the system control unit 201 determines whether or not an operation has been made to a portion of the operation units 104 other than the touch panel 104b. The processing proceeds to step S331 if it is determined that an operation has been performed, and proceeds to step S332 if not.

In step S331, the system control unit 201 executes processing corresponding to the operation performed in step S330. For example, if it is determined that a setting button (functional button), which is a physical push button included in the operation units 104 on the second screen, has been pressed, the screen is caused to transition to the first screen.

Note that, in this case, the determination result in step S316 is also YES, and the processing proceeds to step S317. An operation made to a portion of the operation units 104 other than the touch panel 104*b* is accepted regardless of the on/off state of the touch restriction function, the on/off state of the touch panel setting, and the validity/invalidity of touch operations. Accordingly, even if touch operations made to the second screen are invalid, it is possible to switch the screen to the setting screen (FIG. 4A), change the exposure, change the ISO sensitivity, enlarge a live view image, configure settings of the touch shutter function, and change the AF area, for example, by means of an operation other than a touch operation.

In step S332, the system control unit 201 determines whether or not an ending event has occurred. Ending events include power-off and transition to another operation mode such as a reproduction mode, for example. If no ending event has occurred, the processing returns to step S301 to repeat the processing in FIGS. 3A to 3C, and if an ending event has occurred, the processing in FIGS. 3A to 3C ends.

Thus, while the first screen is being displayed, touch operations made to the first screen are validated or invalidated in accordance with the touch panel setting that is applied to either screen, regardless of the on/off state of the touch restriction function. On the other hand, while the second screen is being displayed, control is performed such that touch operations are not accepted unless the touch restriction function is OFF, even if the touch panel setting is ON.

As described above, according to the present embodiment, when touch operations are valid due to a setting (touch panel setting) that is applied regardless of the displayed screen, touch operations are accepted on the first screen even if the touch restriction function is set to an on state, but touch operations are not accepted on the second screen. With this operation, touch operations can be invalidated if the user wants to prevent an unintended operation from being executed as a result of an accidental touch on the screen, as in the case of a shooting standby screen. In the case where the user wants to actively use touch operations as in the case of the setting screen, the user can quickly and easily switch touch operations between valid and invalid states without changing the touch operation settings for the overall camera when he/she wants to validate touch operations.

Second Embodiment

Next, a description will be given of an operation corresponding to a touch operation as per the position of the display unit 101 in a touch control mode according to the present embodiment.

Figure 5A:
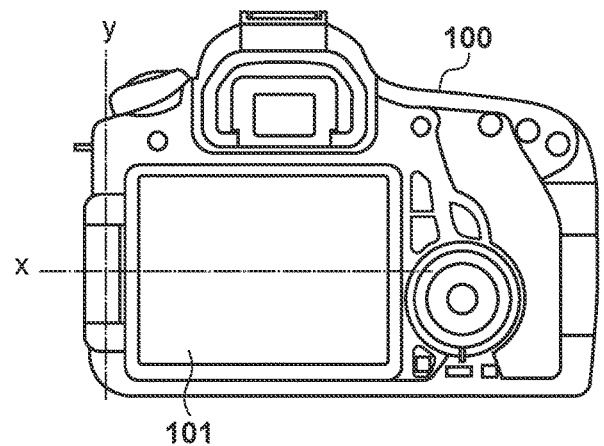
FIGS. 5A to 5C are diagrams illustrating changes in the position of a display unit in the electronic apparatus according to the present embodiment.
Figure 5B:
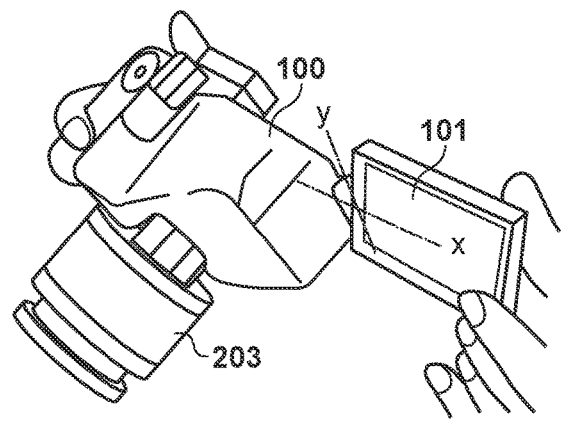
Figure 5C:
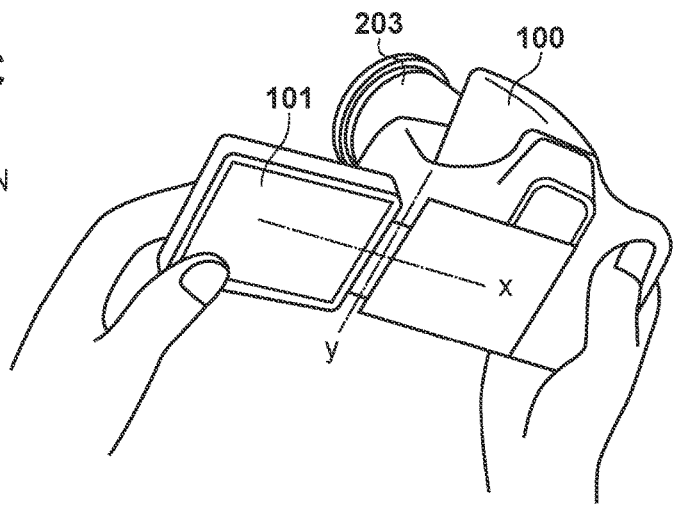

FIGS. 5A to 5C show positional relationships between a main body of the camera and the display unit 101 when the position of the display unit 101 in the digital camera 100 according to the present embodiment is an "inverted closed position", an "open position", and an "inverted open position", respectively. The "inverted closed position" in FIG. 5A refers to a state where the display unit 101 has been rotated around a horizontal axis x such that the display surface of the display unit 101 faces in a direction opposite to the photographic lens 203 side on the main body, and has been rotated around a vertical axis y such that the exterior shape of the display unit 101 has been folded into the exterior shape of the main body, and such that the back face of the display unit 101 opposes the back face on the side opposite to the photographic lens on the main body. The "inverted closed position" in FIG. 5A is used in a normal shooting state when a photographer shoots an image of an object. The "open position" in FIG. 5B refers to a state where the display unit 101 has been rotated around the vertical axis y in the diagram from the "inverted closed position" in FIG. 5A such that the display unit 101 is located outside the main body, and the display unit 101 has been rotated around the horizontal axis x in the diagram such that the display surface of the display unit 101 faces the photographic lens 203 side of the main body. The "open position" in FIG. 5B is used when the user wants to show the composition to the object, or when the photographer shoots an image of himself/herself, for example. The "inverted open position" in FIG. 5C refers to a state where the display unit 101 has been rotated around the horizontal axis x from the "open position" in FIG. 5B such that the display surface of the display unit 101 faces in the direction opposite to the photographic lens 203 side of the main body. The "inverted open position" in FIG. 5C is used in a state where the camera is located above the photographer's head or at his/her feet, and the display unit 101 is rotated at an angle at which the display unit 101 can be easily viewed to perform shooting, for example. Note that, although not shown in the diagram, the position of the display unit 101 can also be set to a "closed position". The "closed position" refers to a housed state where the display surface of the display unit 101 is closed so as to oppose the main body, and is a position at which the display surface cannot be seen from the back face of the digital camera 100.

FIG. 6 shows a flowchart of touch restriction processing corresponding to the position of the display unit in the touch control mode. This processing is achieved by a program stored in the nonvolatile memory 213 being expanded in the system memory 212 and executed by the system control unit 201.

In step S601, the system control unit 201 determines whether or not the touch panel setting is set to an on state, and the processing proceeds to step S602 if the touch panel setting is ON, and proceeds to step S607 if not. The touch panel setting is similar to that described in step S304 in FIG. 3A.

In step S602, the system control unit 201 determines whether or not the touch restriction function is set to an on state, and the processing proceeds to step S604 if the touch panel setting is ON, and proceeds to step S603 if not.

In step S603, the system control unit 201 validates touch operations if the touch restriction function is OFF, or when the display unit 101 is located at the open position or the inverted open position even if the touch restriction function is ON, or while the first screen is being displayed even if the display unit 101 is at the inverted closed position.

In step S604, the system control unit 201 determines, based on the detection result obtained by the variable angle detection unit 219, whether or not the display unit 101 is at the open position, and the processing proceeds to step S603 if the display unit 101 is at the open position, and proceeds to step S605 if not.

In step S605, the system control unit 201 determines, based on the detection result obtained by the variable angle detection unit 219, whether or not the display unit 101 is at the inverted open position, and the processing proceeds to step S603 if the display unit 101 is at the inverted open position, and proceeds to step S606 if the display unit 101 is not at the inverted open position, i.e. at the inverted closed position.

In step S606, the system control unit 201 determines whether or not the second screen is displayed, and the processing proceeds to step S607 if the second screen is displayed, and proceeds to step S603 if not, i.e. the first screen is displayed.

In step S607, the system control unit 201 invalidates touch operations if the touch panel setting is OFF, or if the touch restriction function is ON, the display unit 101 is at the inverted closed position, and the second screen is being displayed.

According to the present embodiment, even in the case where touch operations are set to a valid state by the setting (tough panel setting) that is applied regardless of the displayed screen, if the touch restriction function is set to an on state, touch operations are accepted when the display unit 101 is at the open position or the inverted open position, or while the first screen is being displayed even if the display unit 101 is at the inverted closed position, and touch operations are not accepted while the second screen is being displayed when the display unit 101 is at the inverted closed position. With this operation, it is difficult to make an operation to the screen when the display unit 101 is at the open position or the inverted open position, and the touch panel is less often touched accidentally, and therefore, touch operations are validated. Conversely, when the display unit 101 is at the inverted closed position, touch operations are invalidated in order to prevent the touch panel from being accidentally touched, causing an unintended operation to be executed. Thus, the user can quickly and easily switch touch operations between valid and invalid state without changing the settings of touch operations for the overall camera.

Note that, in the second embodiment, in short, the variable-angle display unit 101 being at the inverted closed position is added to conditions under which the touch restriction function is turned on and touch operations are invalidated, and the second embodiment can be carried out in combination with the first embodiment. That is, a configuration may be employed in which the position of the display unit 101 is determined immediately before touch operations are invalidated in step S305 or S315 in FIGS. 3A and 3B, touch operations are invalidated in step S305 or S315 in the case of the inverted closed position, and touch operations are not invalidated (kept valid) in cases of other positions.

Note that although the first screen is the setting screen and the second screen is the shooting standby screen in the above-described first and second embodiments, the first and second screens are not limited to this example and may be the following screens. For example, the first screen may be a reproduction screen for reproducing an image, or a menu screen for selecting any of a plurality of menu items. The first screen may be any other screen to which the screen transitions from the second screen in accordance with a touch operation. The second screen may be any screen other than the shooting standby screen as long as it is a screen displayed immediately after the power is turned on. If a screen displayed immediately after the power is turned on is treated as the above-described second screen regardless of whether or not the displayed screen is the shooting standby screen, it is possible to prevent an erroneous operation caused by an accidental touch operation performed in a state where the power is ON and no other operation has been performed. The shooting standby screen is not limited to a screen on which a live-view display is performed either, and may be a screen displaying a list of shooting settings, or a screen in the case where an optical viewfinder or an eyepiece finder is in use and no display is performed on the display unit 101. In these cases as well, if touch operations made to the touch panel 104b are enabled when the touch restriction function is OFF, an erroneous operation caused by an accidental touch can be prevented by the touch restriction function. Furthermore, a screen displayed after a shooting preparation instruction (SW1) or a shooting instruction (SW2), or a screen that is automatically displayed after an elapse of a predetermined time while no operation is performed may also be treated as the above-described second screen. Since the screens displayed after a shooting preparation instruction, after shooting, or after an elapse of a predetermined time while no operation is performed are the screens displayed when a user operation has been finished to some extent, the user is likely to carry the digital camera 100 with these screens displayed. By treating this screen as the second screen according to the above-described embodiments and turning on the touch restriction function, an erroneous operation caused by an accidental touch can be prevented when the user carries the digital camera 100. An accidental touch when the user carries the digital camera 100 is, for example, an erroneous touch caused by the hand holding the digital camera 100, or an erroneous touch caused by the belly when the digital camera 100 is hung from the neck using a strap. Also, in the case where touch operations are valid, any screen on which an instruction to cause the screen transition to the first screen can be given by means of a touch operation may be treated as the second screen. Upon the screen transitioning to the first screen, an operation that may be inconvenient if performed erroneously is enabled, such as changing settings, but by turning on the touch restriction function in the second screen on which an instruction to transition to the first screen can be performed by means of a touch operation, the transition to the first screen caused by an accidental touch operation can be prevented from the beginning. Accordingly, it is possible to prevent an inconvenient operation from being performed on the first screen by an accidental touch operation.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention.

Although the above embodiments have described an exemplary case where the electronic apparatus according to the present invention is applied to an image capturing apparatus such as a digital camera, the present invention is not limited to this example. The present invention is applicable to, for example, an apparatus having a touch panel function. More specifically, the present invention is applicable to a personal computer, a tablet terminal which is a kind of a personal computer, a mobile telephone terminal, a smartphone which is a kind of a mobile telephone terminal, a PDA (Personal Digital Assistant), a mobile image viewer, a printer device having a display function, a digital photo frame, a music player, a game console, an electronic book reader, medical equipment and the like.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201544, filed Oct. 9, 2015 which is hereby incorporated by reference herein in its entirety.

What is claimed is:

1. An electronic apparatus comprising a memory and at least one processor which function as:
   a detection unit configured to detect a touch operation;
   a setting unit configured to set a touch restriction mode for restricting acceptance of a touch operation, in accordance with a specific operation being performed; and
   a control unit configured to perform:
   (a) control so as to, in a state where the touch restriction mode is not set, change a setting of the apparatus in accordance with a touch operation being performed in a case where a first screen is displayed on a display unit, and execute a specific function in accordance with a touch operation being performed in a case where a second screen different from the first screen is displayed on the display unit; and
   in a state where the touch restriction mode is set, (b) control so as to change a setting of the apparatus in accordance with a touch operation being performed in a case where the first screen is displayed on the display unit, and to not execute at least the specific function in accordance with a touch operation in a case where the second screen is displayed on the display unit,
   wherein, if the second screen is displayed in a state where the touch restriction mode is set, the control unit is further configured to perform:
   (c) control so as to not extend a time until an automatic power-off function is executed even if a touch operation is detected; or
   (d) control so as to extend a time until the automatic power-off function is executed for a predetermined time in accordance with a touch operation being performed in a case where a remaining time until the automatic power-off function is executed is within a predefined time, and so as to not further extend the time until the automatic power-off function is executed even if a touch operation is performed after the extension is performed.

2. The apparatus according to claim 1, wherein the specific operation is an operation made to an operation member for accepting an operation other than a touch operation.

3. The apparatus according to claim 1, wherein the memory and the at least one processor further function as a unit configured to switch the second screen to the first screen in accordance with a touch operation, and
   wherein the specific function is a function of switching the second screen to the first screen.

4. The apparatus according to claim 1, wherein, in the state where the touch restriction mode is set, the control unit performs control so as to not execute, in accordance with a touch operation, a function that can be executed with a touch operation made to the second screen in a state where the touch restriction mode is not set, regardless of whether or not the function is the specific function.

5. The apparatus according to claim 1, wherein the first screen is automatically switched to the second screen in accordance with an elapse of a predetermined time with no operation performed on the first screen.

6. The apparatus according to claim 1, wherein the second screen is displayed on start-up of the electronic apparatus.

7. The apparatus according to claim 1, wherein, if the electronic apparatus is an image capture apparatus, the setting of the apparatus includes at least one of a setting item relating to a shooting operation and a shooting condition, and a setting item relating to recording quality and the number of images to be shot, and
   wherein the specific function includes at least one of changing exposure, changing an ISO sensitivity, enlarging a live view image, setting a touch shutter function, and changing an AF area.

8. The apparatus according to claim 7, wherein if the electronic apparatus is an image capture apparatus, the second screen is a shooting standby screen.

9. The apparatus according to claim 7, wherein if the electronic apparatus is an image capture apparatus, in accordance with an operation made to a shutter button in a state where a screen other than the second screen is displayed, the screen is switched to the second screen.

10. The apparatus according to claim 1, wherein the memory and the at least one processor further function as a second setting unit configured to validate or invalidate a touch operation made to the electronic apparatus, the second setting unit being different from the touch restriction mode.

11. The apparatus according to claim 1, wherein a position of the display unit is variable between a closed position in a state of being folded into an exterior shape of the electronic apparatus and an open position at which the display unit is located outside the exterior shape of the electronic apparatus, and the display unit has a second detection unit configured to detect a position of the display unit, and
   wherein in a state where the touch restriction mode is set, the control unit invalidates a touch operation if the position of the display unit being at the closed position is detected in a case where the second screen is displayed, and validates a touch operation if the position of the display unit being at the open position is detected, even in a case where the second screen is displayed.

12. The apparatus according to claim 1, further comprising a strap attaching unit to which a strap for hanging the electronic apparatus can be attached.

13. The apparatus according to claim 1, wherein, in the state where the touch restriction mode is set, the control unit performs control so as to perform a display indicating a state where touch is restricted, in accordance with a touch operation performed in a case where the second screen is displayed.

14. The apparatus according to claim 1, wherein the detection unit detects a touch operation on a display surface of the display unit.

15. The apparatus according to claim 1, wherein, if the second screen is displayed in a state where the touch restriction mode is set, the control unit performs the control (c) and not the control (d).

16. The apparatus according to claim 1, wherein, if the second screen is displayed in the state where the touch restriction mode is set, the control unit performs the control (d) and not the control (c).

17. A control method of an electronic apparatus comprising a memory and at least one processor which function as a detection unit configured to detect a touch operation and a setting unit configured to set a touch restriction mode for restricting acceptance of a touch operation in accordance with a specific operation different from a touch operation being performed, the method comprising:
performing:
(a) control so as to, in a state where the touch restriction mode is not set, change a setting of the apparatus in accordance with a touch operation being performed in a case where a first screen is displayed on a display unit, and execute a specific function in accordance with a touch operation being performed in a case where a second screen different from the first screen is displayed on the display unit, and
in a state where the touch restriction mode is set, (b) control so as to change a setting of the apparatus in accordance with a touch operation being performed in a case where the first screen is displayed on the display unit, and not execute at least the specific function in accordance with a touch operation in a case where the second screen is displayed on the display unit,
wherein the control method further comprises, if the second screen is displayed in a state where the touch restriction mode is set, performing:
(c) control so as to not extend a time until an automatic power-off function is executed even if a touch operation is detected; or
(d) control so as to extend a time until the automatic power-off function is executed for a predetermined time in accordance with a touch operation being performed in a case where a remaining time until the automatic power-off function is executed is within a predefined time, and so as to not further extend the time until the automatic power-off function is executed even if a touch operation is performed after the extension is performed.

18. A non-transitory computer-readable storage medium storing a program for causing a memory and at least one processor of a computer to function as:
a detection unit configured to detect a touch operation;
a setting unit configured to set a touch restriction mode for restricting acceptance of a touch operation, in accordance with a specific operation different from a touch operation being performed; and
a control unit configured to perform:
(a) control so as to, in a state where the touch restriction mode is not set, change a setting of the computer in accordance with a touch operation being performed in a case where a first screen is displayed on a display unit, and execute a specific function in accordance with a touch operation being performed in a case where a second screen different from the first screen is displayed on the display unit; and
in a state where the touch restriction mode is set, (b) control so as to change a setting of the computer in accordance with a touch operation being performed in a case where the first screen is displayed on the display unit, and to not execute at least the specific function in accordance with a touch operation in a case where the second screen is displayed on the display unit,
wherein, if the second screen is displayed in a state where the touch restriction mode is set, the control unit is further configured to perform:
(c) control so as to not extend a time until an automatic power-off function is executed even if a touch operation is detected; or
(d) control so as to extend a time until the automatic power-off function is executed for a predetermined time in accordance with a touch operation being performed in a case where a remaining time until the automatic power-off function is executed is within a predefined time, and so as to not further extend the time until the automatic power-off function is executed even if a touch operation is performed after the extension is performed.

* * * * *